United States Patent [19]

Mannherz

[11] 4,296,636
[45] Oct. 27, 1981

[54] NOISE-REDUCING ELECTRODES FOR ELECTROMAGNETIC FLOWMETER

[75] Inventor: Elmer D. Mannherz, Bucks County, Pa.

[73] Assignee: Fischer & Porter Co., Warminster, Pa.

[21] Appl. No.: 152,479

[22] Filed: May 22, 1980

[51] Int. Cl.³ .............................................. G01F 1/58
[52] U.S. Cl. ............................. 73/861.12; 73/861.17
[58] Field of Search ........... 73/861.12, 861.14, 861.16, 73/861.17; 324/446

[56] References Cited

U.S. PATENT DOCUMENTS 3,314,876  4/1967  Ransley .......................... 204/294 X
3,783,687  1/1974  Mannherz et al. ............... 73/861.17

Primary Examiner—Charles A. Ruehl
Attorney, Agent, or Firm—Michael Ebert

[57] ABSTRACT

An electromagnetic flowmeter wherein a liquid to be metered is conducted through a flow tube to intersect a transverse magnetic field produced by an electromagnet, the resultant signal induced in the liquid being transferred to a pair of electrodes mounted at diametrically-opposed points on the tube. To avoid spurious signal components arising from stray couplings between the electromagnet and the loop constituted by the electrodes and the liquid bridging the electrodes, the coil of the electromagnet is energized by a low-frequency wave whose frequency is well below the standard a-c power line frequency. And, to avoid noise components produced when the liquid being metered is a slurry containing solid particles which impinge on the surface of the electrodes, the electrodes are fabricated of or coated by a carbide metal or an alloy thereof whose metallurgical hardness is such as to substantially reduce the generation of such noise components.

6 Claims, 1 Drawing Figure

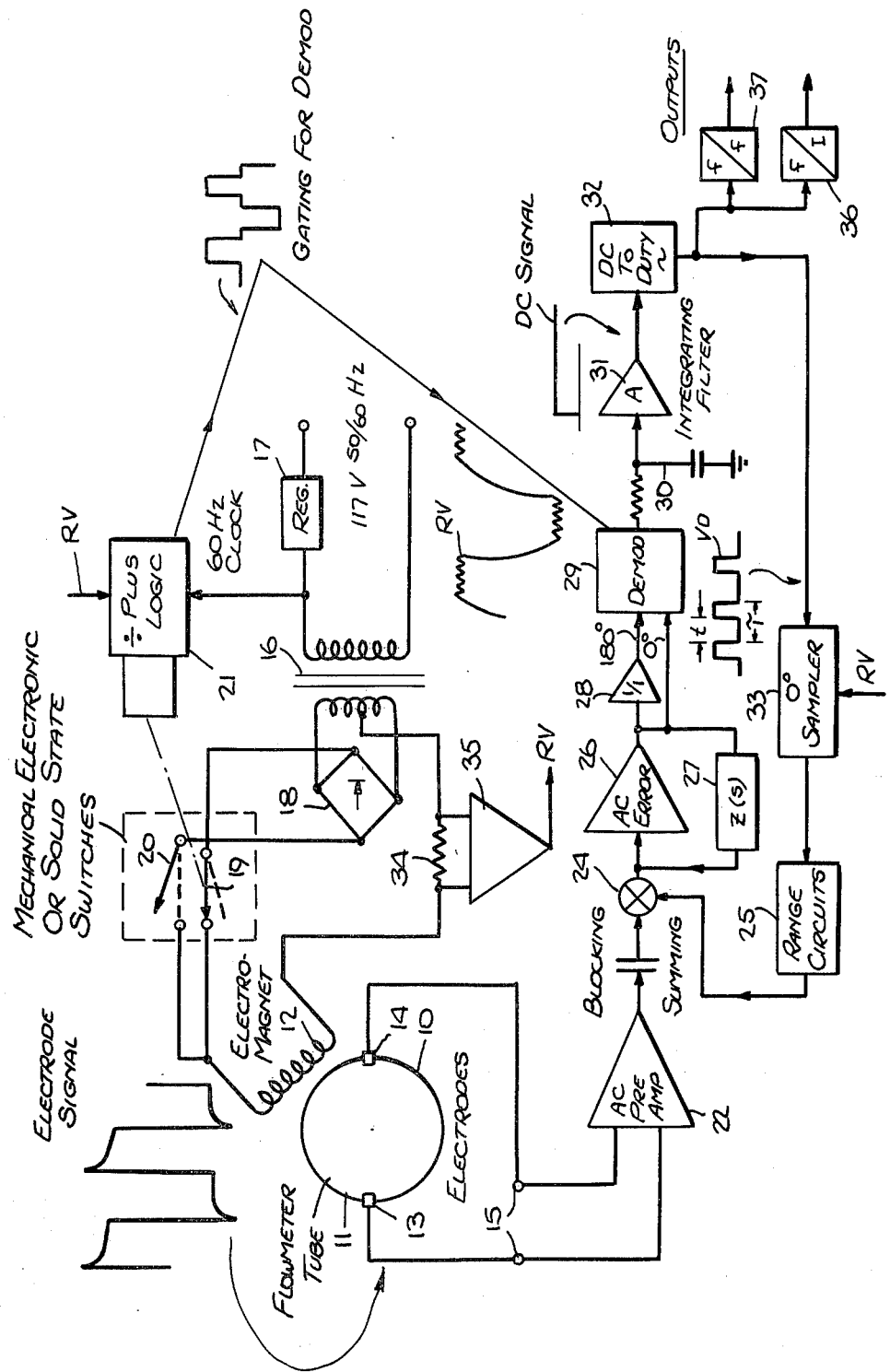

NOISE-REDUCING ELECTRODES FOR ELECTROMAGNETIC FLOWMETER

BACKGROUND OF THE INVENTION

Field of Invention

This invention relates generally to electromagnetic flowmeters, and more particularly to a flowmeter in whose excitation current for the electromagnetic coil is a low-frequency wave and in which the electrodes have a metallurgical hardness which minimizes the generation of a noise component when the liquid is a slurry having solid particles that impinge on the electrode surfaces.

In an electromagnetic flowmeter, the liquid whose flow rate is to be measured is conducted through a flow tube provided with a pair of diametrically-opposed electrodes, a magnetic field perpendicular to the longitudinal axis of the tube being established by an electromagnet. When the flowing liquid intersects the field, a voltage is induced therein which is transferred to the electrodes. The voltage, which is proportional to the average velocity of the liquid and hence to its average volumetric rate, is then amplified and processed to actuate a recorder or indicator.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Through A-C operation as disclosed in the Cushing U.S. Pat. No. 3,693,439 is clearly advantageous in that polarization is obviated and the A-C flow induced signal may be more easily amplified, it has distinct drawbacks. The use of an alternating flux introduces spurious voltages that are unrelated to flow rate and, if untreated, give rise to inaccurate indications. The two spurious voltages that normally are most troublesome are:

1. stray capacitance-coupled voltages from the coil of the electromagnet to the electrodes, and
2. induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the A-C flow-induced voltage. Actual tests have indicated that this is not true in that a component exists in-phase with the flow-induced voltage. Hence, that portion of the "quadrature voltage" that is in-phase with the flow-induced voltage signal constitutes an undersirable signal that cannot readily be distinguished from the flow induced signal, thereby producing a changing zero shift effect.

Pure "quadrature" voltage has heretofore been minimized by an electronic arrangement adapted to buck out this component, but elimination of its in-phase component has not been successful. Existing A-C operated electromagnet flowmeters are also known to vary their calibration as a function of temperature, fluid conductivity, pressure and other effects which can alter the spurious voltage both with respect to phase and magnitude.

Hence it becomes necessary periodically to manually re-zero the meter to correct for the effects on zero by the above-described phenomena.

All of the adverse effects encountered in A-C operation of electromagnetic flowmeters can be attributed to the rate of change of the flux field $(d\phi)/dt$, serving to induce unwanted signals in the pick-up loop. If, therefore, the rate of change of the flux field could be reduced to zero value, then the magnitude of quadrature and of its in-phase component would become non-existent. Zero drift effects would disappear.

When the magnetic flux field is a steady state field, as, for example, with continuous d-c operation, the ideal condition $d\phi/dt=0$ is satisfied. But, as previously noted, d-c operation to create a steady state field is not acceptable, for galvanic potentials are produced and polarization is encountered.

In the patent to Mannherz et al., U. S. Pat. No. 3,783,687, whose entire disclosure is incorporated herein by reference, there is disclosed an electromagnetic flowmeter in which the excitation current for the electromagnetic coil is a low-frequency wave serving to produce a periodically-reversed steady state flux field, whereby unwanted in-phase and quadrature components are minimized without giving rise to polarization and galvanic effects. This low frequency wave is derived by means of a presettable scaler coupled to the standard a-c power line (60 Hz) and is at a frequency in the order of $1\frac{7}{8}$, $3\frac{3}{4}$, $7\frac{1}{2}$ or 15 Hz.

When the fluid being metered is in the form of a slurry containing solid particles which impinge on the surface of the electrodes as the slurry flows through the tube, we have found that a substantial noise component is generated which may make detection of the signal more difficult. Noise is any voltage that does not convey measurement information. Under the most favorable circumstances where noise has been minimized by filtering or other expedients, there are still certain sources of noise present resulting from the granular nature of matter and energy.

While noise fluctuations may be small compared with the total energy transfer involved in most measurements, the existence of a noise background limits the ultimate sensitivity to which a measurement can be carried. Sensitivity-limiting noise factors include Brownian motion, the Johnson noise in a resistance element and the Barkhausen effect in a magnetic element.

In the case of an electromagnetic flowmeter having a coil excited by an alternating current or a periodically interrupted direct current, it has been found that when the fluid being metered is a slurry containing solid particles, a spectrum of noise voltages is generated as a result of impingement of the solid particles on the surfaces of the electrodes. However, the frequency components of this spectrum does not include the frequency of the standard a-c power line (i.e. 50 or 60 Hz). Hence in a system of this type in which the excitation current is at the line frequency no difficulty is experienced in discriminating between the flow-induced signal and noise components to provide a favorable signal-to-noise ratio.

But in the case of an electromagnetic flowmeter of the above-described Mannherz type in which the excitation frequency is well below 60 Hz, we find that the frequency components of the noise spectrum do lie in the excitation frequency range; hence discrimination between noise and signal cannot be effected, and the signal-to-noise ratio is unfavorable. Indeed, in some instances, the magnitude of the noise relative to that of the flow-induced signal is such as to render the meter useless.

SUMMARY OF INVENTION

In view of the foregoing, the main object of this invention is to provide an electromagnet flowmeter for metering a slurry having solid particles therein which impinge on the flowmeter electrodes, which flowmeter has an electrode structure which minimizes the generation of noise components.

More particularly, it is an object of this invention to provide a flowmeter whose excitation current is constituted by a low frequency wave whose frequency is low relative to the frequency of the standard a-c power line from which the waves are derived, the flowmeter including conductive electrodes fabricated of or coated by a carbide metal or any allow thereof whose metallurgical hardness is such as to substantially reduce the generation of noise components.

Briefly stated, these objects are attained in an electromagnetic flowmeter in accordance with the invention which includes a flow tube having a pair of electrodes mounted thereon in diametrically-opposed positions and an electromagnet provided with an excitation coil to produce a transverse magnetic field which is intersected by the liquid passing through the tube, the voltage induced in the liquid being transferred to the electrodes to provide a flow-induced signal.

Applied to the coil is a low-frequency wave preferably in the form of periodic pulses of direct-current derived through rectifiers from a standard a-c power line, the pulses having a reptition rate which is low relative to the line frequency, whereby a steady state field is periodically established in the flow tube. To minimize the generation of noise components which are developed when the liquid is a slurry containing solid particles which impinge on the electrode surfaces, the electrodes are fabricated of or coated by a carbide metal or an alloy thereof.

OUTLINE OF DRAWING

For a better understanding of the invention as well as other objects and features thereof, reference is made to the following detailed description thereof to be read in conjunction with the accompanying drawing whose single FIGURE is a block diagram of an electromagnetic flowmeter in accordance with the invention.

DESCRIPTION OF THE INVENTION

Referring now to the drawing, there is shown a flowmeter system in accordance with the invention, constituted by a primary in the form of an electromagnetic flowmeter adapted to produce a low-frequency signal output whose amplitude is proportional to the flow rate of the liquid being measured, and a secondary which converts this low level a-c signal to a proportinal d-c current output signal.

In addition to the analog d-c current output, the secondary also yields a pulse output whose frequency is proportional to flow rate, the pulse output being useful in operating digital registers, counters or batch control systems. By means of proper scale factoring, registry of total accumulated flow may be integrated from this rate signal.

The flowmeter primary includes a flow tube 10 through which the liquid 11 to be measured is conducted. An electromagnetic having a coil 12 is provided to establish a magnetic field transverse to the direction of flow, which is parallel to the longitudinal axis of the tube. Electrodes 13 and 14 in contact with the flowing fluid are disposed at diametrically-opposed points on the flow tube on an axis which is perpendicular both to the longitudinal direction of flow and the transverse magnetic field.

As is well known, a voltage is induced in the liquid whose flow intersects the magnetic field, this voltage being transferred to the electrodes to produce a signal at flowmeter output terminals that reflects the flow rate. This signal is referred to as the flow-induced signal to distinguish it from spurious signal components that are independent of flow rate and noise.

Magnet coil 12 is energized by a relatively low-frequency square wave derived from a full-wave rectifier power supply constituted by a transformer 16 whose primary is connected to an a-c power line through a regulator 17, the line supplying the usual 50 or 60 Hz current. The secondar of transformer 16 is connected to the input junctions of a full-wave rectifier bridge 18, whose output junctions are connected to the respective movable contacts of two single-pole single-throw switches 19 and 20 whose fixed contacts are both connected to one end of magnet coil 12. The other end of the coil is connected to the center tap of the secondary of transformer 16.

When switch 19 is closed and switch 20 is simultaneously open, the rectified output is applied to the magnet coil in one polarity, and when switch 19 is open and switch 20 is simultaneously closed, the polarity is reversed. While for purpose of explanation, switches 19 and 20 are shown as mechanical devices, in practice these switches are in electronic form and may be constituted by thyratrons, triacs or any other type of electronic switching device in vacuum tube or solid state form.

Switches 19 and 20 are activated at a rate which is low relative to the frequency of the a-c line. This is accomplished by means of a presettable scaler or frequency divider 21 to which the 60 Hz line voltage is applied as a clock signal, the scaler yielding low frequency pulses in the order of $1\text{-}\frac{7}{8}$, $3\text{-}\frac{3}{4}$, $7\text{-}\frac{1}{2}$ or 15 Hz.

The low frequency pulses from the scaler are applied to the firing electrodes of the two triac switches (or whatever other electronic switching devices are used) to alternately turn on the triacs and thereby connect either the positive or the negative side of the full-wave rectified 60 Hz voltage to the magnet coil. Thus when switch 19 is closed, current flows through the magnet coil in one direction, and when switch 20 is closed, the current flows in the reverse direction.

Because the output of the full-wave rectifier is a raw unfiltered direct voltage, it is composed of a continuous train of half-cycle pulses, all of the same polarity. But with the low-frequency switching action. The voltage applied to magnet coil 12 is periodically reversed in polarity, as a result of which the current passing through the coil has a 120 Hz ripple component.

Because the electromagentic has a relatively high inductance, it functions as a filter choke and, in practice, it takes out as much as 75 percent of the ripple component. The remaining portion of the 120 Hz ripple component that appears in the flow-induced signal is smoothed out at the summing junction of the secondary via the filter action of the associated error amplifier, to be later described. This obviates the need for filter capacitors associated with the choke, as in conventional filters. Thus, the system functions as if it were excited by a "square wave equivalen" having a substantially constant amplitude.

The flow induced signal appearing at output terminals 15 of the flowmeter primary is fed to a secondary constituted by a converter. This converter is essentially an all solid state a-c feedback system producing a frequency output (and optional current) whose rate is proportional to flow.

In the converter, the flow-induced signal appearing at output terminals 15 is applied to the first stage of the converter which is an a-c pre-amplifier 22. This signal has a generally square-wave formation but for the spikes appearing at the points of polarity reversal. These spikes are the result of switching transients or surges and have a duration depending on the inductance-resistance time constant of the electromagnetic circuit.

The constant level portion of the square wave reflects the steady state condition of the magnetic field and has an amplitude that is directly proportional to the velocity of liquid passing through the flow tube. Hence it is only this portion of the signal which is of interest for accurate measurement purposes.

The output of pre-amplifier 22 is applied through a blocking capacitor 23 to one input of a summing junction 24 to whose other input is fed the output of a range attenuation circuit 25 from an error signal type of feedback loop. The error signal produced by a comparison of the flow signal and the feedback signal in the summing junction is amplified in a-c error amplifier 26, which is provided with a sub-negative feedback circuit 27 adapted to attenuate all frequencies lower and higher than that of the error signal.

The a-c output of error amplifier 26 is applied as a 0° signal with respect to the flow signal to a full-wave demodulator 29 and is also applied to an inverting (1:1) amplifier 28 whose output is applied as a 180° signal to full-wave demodulator 29. The operation of the demodulator is synchronized with the low-frequency switching rate of the magnet coil and is so gated as to block the applied error signal at those points corresponding to the point of polarity reversal, the blockage being maintained for the duration of the inductance-resistance time constant of the electromagnetic circuit. In this way, the d-c output of the demodulator reflects only the steady state magnetic flux condition, the spike portions of the flow-induced signal being suppressed.

In order to so synchronize the demodulator, the frequency divider 21 which responds to the 50 to 60 cycle signal to produce low-frequency control pulses for governing the electromagnetic switching action is provided with suitable logic to produce gating pulses at the same low-frequency rate. These gating pulses are coincident with the steady state portion of the flow-induced signal. Thus, the demodulator is activated only during the steady state intervals and is otherwise blocked. As a consequence, the secondary only looks at the flow induced signal during the point that $d\phi/dt$ is equal to zero.

The d-c output pulses produced by demodulator 29 are applied to a resistance-capacitance integrating circuit 30 to produce a direct-voltage error signal whose magnitude is a function of flow rate. This error signal is applied to a direct-current amplifier 31, whose output is used as a controlled bias for a d-c to frequency converter 32 that, in practice, may take the form of a blocking oscillator.

The blocking oscillator translates the d-c error signal level to a variable frequency pulse train which exhibits a duty cycle that is proportional to the error signal. (Duty cycle is defined as the pulse width or on-time interval (t) divided by the total period (T)). This variable duty cycle error signal VD is used to drive the output circuits of the system as well as serving as the take-off point for the error signal feedback circuit.

For purposes of feedback, the variable duty cycle error signal must first be restored to a proportional low-frequency signal (i.e., 1-⅞ Hz or whatever low frequency is in effect). This is accomplished by means of a sampling circuit 33 coupled to the dc-to-duty cycle converter 32 and acting to sample an in-phase reference voltage RV derived from the electromagnet circuit. To generate this reference voltage, a fractional ohm resistor 34 is interposed between magnet coil 12 and the center tap of the secondary of transformer 16, the voltage drop thereacross depending on current flow through the magnet coil. This voltage is applied to an operational amplifier 35 to produce reference voltage RV at its proper level.

The output of sampler 33 is constituted by the duty-cycle pulses derived from the d-c to frequency converter, enveloped by the low frequency square wave reference voltage RV. This output is fed to summing junction 24 through the range attenuator 25. Inasmuch as this feedback signal depends on the amplitude of reference voltage RV, any variation in the voltage as a result of line fluctuations will proportionately change the feedback signal. Since it is the ratio of the flow-induced signal to the feedback signal that constitutes the measurement criterion, no loss of accuracy will be experienced with variations in line voltage (within reasonable limits).

The signal from the dc-to-duty cycle converter is applied to a duty-cycle-to-dc converter 36, which converts the pulses of the former into an analog d-c ouput that is proportional to fluid flow rate. The signal from the dc-to-duty cycle converter is also applied to a pulse scaler 37 which converts the applied pulses into engineering units which are available to drive an external counter.

Instead of reversing polarity, the electronic switches may be arranged to merely interrupt the flow of unidirectional half-wave pulses to the magnet coil so that instead of a square-wave current in the coil in which successive square wave pulses alternate in polarity, all of the square-wave pulses are of the same polarity.

As pointed out previously, when electrodes 13 and 14 are fabricated of conventional material such as stainless steel or platinum, and the liquid 11 being metered is a slurry having solid particles which impinge on the electrode surface in the course of passage through flow tube 10, noise voltages are generated whose magnitude is relatively high. With low-frequency excitation currents, the excitation frequency range lies within the spectrum of noise components; hence the noise components tend to mask the flow-induced signal and it is difficult to obtain accurate flow rate readings.

To overcome this drawback, use is made of electrode materials of exceptionally high metallurgical hardness, far above that of stainless steel. Suitable for this purpose are electrodes made entirely of boron carbide or made of conventional metals and clad with boron carbide so that the particles in the slurry impinge on an extremely hard carbide surface. While carbides have a greater electrical resistivity then stainless steel and other metals conventionally used for electrodes in contact with a fluid being metered, we have found that the reduction in noise more than compensates for the reduced conductivity of the electrodes. Moreover, the high input impedance of the converter renders the increased electrical resistivity immaterial.

We have found that the electrode material for this purpose must have a hardness of at least Rockwell A85 and higher. The electrodes need not be a pure carbide, for extremely hard alloys of tungsten carbide and cobalt are also suitable. A preferred alloy is a blend of tungsten carbide, tantalum carbide, cobalt and tantalum; the harder the material, the lower the noise content in the electrode signal output.

I claim:

1. An electromagnetic flowmeter for measuring the flow rate of a slurry containing solid particles, said flowmeter comprising:
    A. a flow tube having a pair of electrodes mounted thereon at diametrically-opposed positions, said electrodes having a surface with a metallurgical hardness of at least Rockwell A85, whereby the impingement of said solid particles thereon does not result in the substantial generation of noise components; and
    B. an electromagnet having a coil which is excited by a low frequency wave derived from a standard a-c power line, the frequency of the wave being low relative to that of the line to produce a transverse magnetic field within the tube which is intersected by the slurry, the voltage induced in the slurry being transferred to said electrodes to provide a flow-induced signal relatively free of noise components.

2. An electromagnetic flowmeter as set forth in claim 1, wherein said coil excitation is effected by a rectifier connected to said line and switching means periodically applying the output of said rectifier to said coil at a rate which is low relative to the line frequency.

3. An electromagnetic flowmeter as set forth in claim 1, wherein said electrode surface is constituted by a metal carbide or an alloy thereof.

4. A flowmeter as set forth in claim 3, wherein said metal carbide is boron carbide.

5. A flowmeter as set forth in claim 3, wherein said metal carbide is composed of tungsten carbide and cobalt.

6. A flowmeter as set forth in claim 3, wherein said metal carbide is composed of a blend of tungsten carbide, tantalum carbide, cobalt and tantalum.

* * * * *